Oct. 3, 1961     F. C. AVILA ET AL     3,002,261
METHOD OF ASSEMBLING A DYNAMOELECTRIC MACHINE
Filed Jan. 18, 1957
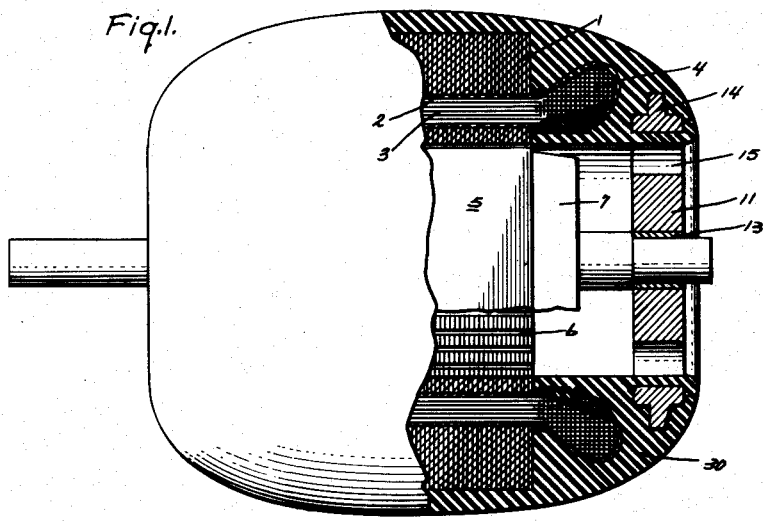
Fig.1.
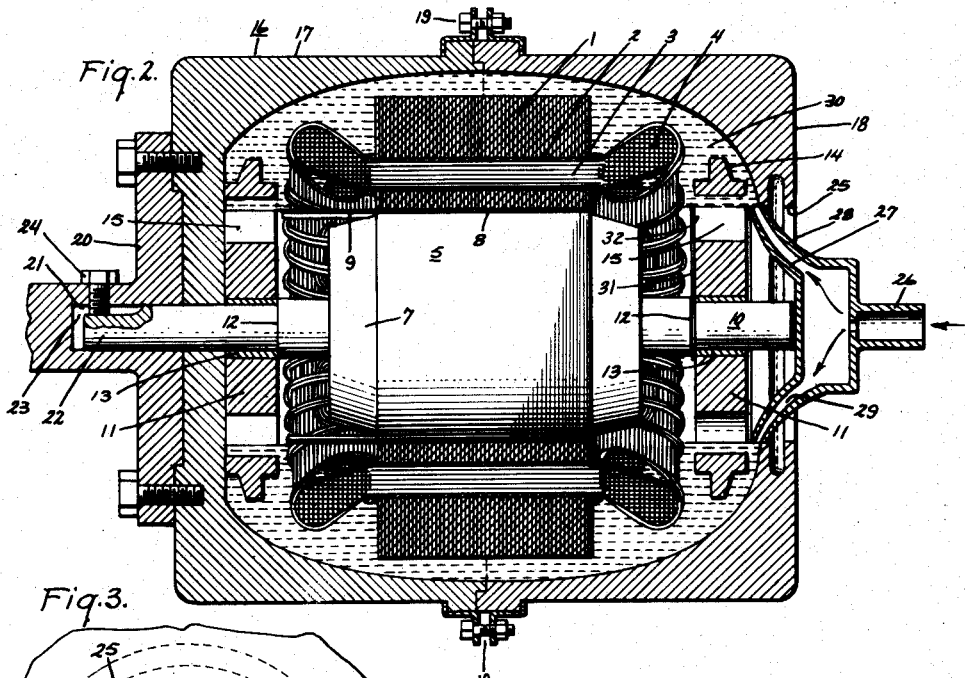
Fig.2.
Fig.3.
Inventors:
Frank C. Avila,
Marshall H. Dole,
by *John G. Irish*
Their Attorney.

United States Patent Office 3,002,261
Patented Oct. 3, 1961

3,002,261
METHOD OF ASSEMBLING A DYNAMO-ELECTRIC MACHINE
Frank C. Avila, Roanoke, and Marshall H. Dole, Hudson, Ind., assignors to General Electric Company, a corporation of New York
Filed Jan. 18, 1957, Ser. No. 635,017
5 Claims. (Cl. 29—155.5)

This invention relates to dynamoelectric machines and more particularly to an improved process for assembling such machines.

It has long been known that castable and moldable synthetic materials may be utilized for many purposes where metals were once the only known solution. This concept has been found of high value in the field of electrical apparatus where parts such as the housing, where the electrical or magnetic properties of the metal were not used, could be replaced with a synthetic material. More particularly, there is considerable information available on the possibility of using synthetic materials for both housing and winding encapsulating purposes in the construction of dynamoelectric machines. However, one difficulty that has been observed to date is that the necessity for keeping the material out of the rotor cavity of the machine has required that at least two separate cast parts be provided, one to provide the major part of the housing and one end shield of the machine, and the other acting as the other end shield in order to close the machine and form a complete unit. In the alternative, casting could be used for the main part of the housing, and a metallic end shield used in cooperation with the cast part to form the machine enclosure. To achieve optimum efficiency in making a motor having a housing of synthetic material, it should be possible to perform a single casting operation which will provide the complete housing for all parts without any further operations being necessary.

It is, therefore, an object of this invention to provide a process whereby a single casting operation will provide a dynamoelectric machine having a complete housing formed about the parts thereof with all parts maintained in proper relation to each other.

A further object of the invention is to provide an improved process, such as that described above, wherein centrifugal casting is used to effect the desired result.

In one aspect thereof, the invention provides a method of making a dynamoelectric machine wherein the first step is to position a stator and a rotor having a shaft in concentric relation by providing shim means between them. A bearing assembly is then mounted about the rotor shaft in normally rotatable relationship therewith; at least a part of this assembly extends radially outward beyond the air gap between the rotor and the stator. This bearing assembly is locked into rigid relation with the shaft by any suitable means such as, for instance, a shim forced between the bearing and a shoulder of the shaft. A mold is then rigidly secured about the rotor, the stator, and the bearing assembly, and a predetermined amount of suitable molding material (preferably in powdered or liquid form) is introduced into the mold as it is rotated on the shaft axis. At the same time, the material is caused to solidify into an integral mass. The predetermined amount of material is such that under the centrifugal force of rotation it extends inwardly in the mold, beyond the outer part of the bearing assembly but short of the stator bore. With this arrangement, the solidification of the material will hold the stator and the bearing assembly in rigid relation to each other with the bearing assembly supporting the rotor shaft. The process of assembly is then terminated by removing all the shim means to release the rotor and stator relative to each other. There is then provided a complete motor assembly ready for operation. Only one casting operation has been required and yet a complete housing and encapsulating mass is provided about the motor to protect the parts and secure them in proper relationship to each other.

The features of the invention which are believed to be novel are set forth with particularity in the appended claims. The invention itself, however, as to its organization together with further objects and advantages thereof, may best be understood by reference to the following description taken in connection with the accompanying drawing.

In the drawing:
FIGURE 1 is a side view, partly in cross section, of a motor formed by the process of the invention;
FIGURE 2 is a side view in cross section of the motor assembly secured within a mold during a casting operation; and
FIGURE 3 is a fragmentary end view partly in cross section of the construction shown in FIGURE 2.

Referring now to the figures of the drawing, there is shown a motor stator core 1 formed in the usual manner of a stacked plurality of thin laminations of magnetic material with a plurality of slots 2 formed extending across the length thereof. Windings 3 are positioned within slots 2 with their end turns 4 arranged at each end of core 1 as shown. A rotor member 5, which may also be formed of a stacked plurality of thin laminations of magnetic material, has conductors 6 extending through slots formed in the rotor; end rings 7 join conductors 6 electrically to form a squirrel cage structure. In the first step of the process of the invention, rotor member 5 is positioned within stator 1 and in concentric relation thereto by the use of shims 8 which are inserted in the air gap formed between the outer surface of rotor 5 and the bore of stator 1 so as to maintain the two members as a unitary assembly in rigid relation to each other. As shown, each shim 8 may be formed to extend out of the air gap as shown at 9 for a reason which will be further described herebelow.

Rotor 5 has a shaft 10 extending from the ends thereof and, in the second step of the inventive process, bearing assemblies 11 are positioned over shaft 10 against shoulders 12 thereof in normally rotatable relation with the shaft. Each bearing assembly 11 is provided in the usual manner with a suitable bearing surface 13 which is secured within the assembly. It is important to the process of this invention, as will appear below, that each bearing assembly 11 have a portion which extends radially outward beyond the bore of stator 1. In the present embodiment, this is effected by making each bearing assembly 11 in the form of a disc (see FIGURE 3) having an outer diameter which is substantially larger in a radial direction than the radius of the stator bore. If desired, bearing assembly 11 may be formed, as shown, with a peripheral flange 14 which increases its holding power when, as will be explained below, it is embedded in housing material. In the present embodiment each bearing assembly 11 is also formed with a number of openings 15 which are each aligned with part of the airgap between the rotor and the stator so that shims 8 are directly in line therewith. A shim 31 is wedged between the shoulder 12 at the right end of shaft 10 (as seen in FIGURE 2) and the adjacent bearing assembly 11 to preclude relative movement thereof. This also forces the other shaft shoulder 12 to the left against the other bearing assembly 11. Thus, both bearing assemblies are rigidly secured with respect to shaft 10. Shim 31 has a portion 32 which extends radially outwardly so as to be easily reached through an opening 15.

Once bearing assemblies 11 have been assembled, as shown in FIGURE 2, they complete a rigid assembly which includes stator 1, rotor 5, and both bearing assemblies 11. This complete assembly is then secured within a mold, generally indicated at 16, which may be formed as shown of two parts 17 and 18 secured together at 19. Part 17 in turn is secured to an actuating member 20 which is internally recessed at 21 to receive the end 22 of rotor shaft 10. Shaft end 22 may be provided with a flat section 23 which cooperates with a threaded member 24 secured within member 20 so as to secure shaft 10 rigidly with respect to mold actuating part 20. With this construction, it will be observed that the remainder of the assembly is rigidly secured within mold 16 with the mold extending around the assembly so as to provide the desired housing contour. Mold part 17 and actuating part 20 preferably fit snugly around shaft 10, while mold part 18 has an opening 25 whose radius is determined (as will be seen) by the extent to which the housing is permitted to extend radially inward. Once this arrangement is complete, mold actuating part 20 is rotated (by means not shown); this rotation is imparted to mold 16 and the entire assembly secured within the mold.

In order to feed material into mold 16 as it rotates, there is provided a member 26 which may be arranged against the end of shaft 10 as shown. Member 26 is hollow, and has a pair of flanges 27 and 28 which form between them a passage 29 which slopes radially outwardly and axially inwardly through opening 25 in mold part 18. Suitable hardenable molding material, such as a liquid or a powder, is fed through rotating member 26 outwardly to passage 29 and into mold 16. Any of many molding compounds, such as epoxy resins, permafil, phenolic resins, etc., may be utilized, and the selection of a particular material does not constitute a part of this invention. Proper selection will provide in addition to toughness, a non-hygroscopic material of high dielectric strength to give the windings 3 maximum protection. However, it is important that the quantity of material be such that when the material is forced to the radially outer part of the mold by the centrifugal force of rotation, it should extend inwardly in the mold beyond the radially outer part of bearing assembly 11 but no farther than the bore of stator 1. In the embodiment described, it has been found desirable to inject sufficient material to cover the flange 14 of bearing assembly 11 and a considerable additional portion extending past the outer edge of openings 15; however, the quantity of material is sufficiently limited to preclude its extending beyond the bore of the stator. It will be observed at this point that the opening 25 in mold part 18 must necessarily be of sufficiently small radius to preclude the escape of any of the molding material through it during the casting process.

The rotation of mold 16 is continued until the material 30 which has been injected into it has completely solidified about the machine parts. The solidification is effected in different ways depending on the material used; for instance, with an epoxy resin, it will generally be desirable to inject a curing agent at the same time as the resin, and to apply heat while with some other materials it is conceivable that no heat would be necessary and that hardening would take place by itself as the rotation was continued. Provided the material is in sufficiently liquid form, either when injected or at some time during the process, it will completely fill all spaces in the winding and the slots so that it not only forms a housing for the motor but also encapsulates the winding and protects the motor parts from damage and moisture. Since the material hardens about the stator, it is, of course, held rigidly as can be seen in both FIGURES 1 and 2. Since the outer part of each bearing assembly 11 is embedded in the material, each bearing assembly is also maintained securely in position.

The last step in the inventive process is to remove the shims 8 from the airgap and shim 31 from between shaft shoulder 12 and bearing assembly 11. This may be achieved mechanically for shims 8 after the motor is removed from the mold 16 by reaching in through openings 15 of the left hand bearing assembly 11 with a suitable instrument, securing the end 9 of each shim 8, and pulling it through the opening. The same procedure may be followed as to shim 31. However, it will be understood that other means of disposing of the shims are available and may be used without departing from the scope of the invention; for instance, it is conceivable that thermoplastic shims might be used and that after the motor is removed from the mold, or even while it is in the mold, heat could be applied to cause the shim means to release the rotor and stator relative to each other.

It will be seen from the foregoing that the inventive concept described above provides a dynamoelectric machine which is easily assembled and which, in a single casting operation, provides the entire housing and encapsulates the stator winding. It will further be seen that with the process described the roor and stator are auomatically properly centered with respect to each other when the assembly is complete and that no further adjustment is necessary for proper operation of the machine.

While this invention has been explained by describing a particular embodiment thereof, it will be apparent that improvements and modifications may be made without departing from the scope of the invention as defined in the appended claims.

What we claim as new and desire to secure by Letters Patent of the United States is:

1. A method of making a dynamoelectric machine comprising the steps of positioning a stator and a rotor having a shaft in concentric relation by providing shim means between them, mounting a bearing assembly about the rotor shaft in rotatable relation therewith, at least part of said bearing assembly extending radially outward beyond the bore of said stator, securing said bearing assembly rigidly with respect to said rotor, securing a mold about said rotor, stator and bearing assembly, said mold having an opening in at least one end thereof, said mold substantially enclosing at least said stator, said rotor, stator and bearing assembly being associated with said mold in rigid assembly therewith, rotating said mold on the axis of said shaft at a predetermined speed sufficient to retain by centrifugal force any material introduced in said mold in the radially outer part of the mold, introducing a predetermined amount of plastic, non-hygroscopic molding material to the interior of said mold through said opening, said material being introduced by means of a feed member cooperating with said opening, said feed member causing said material to be introduced in a radially outward direction to prevent said material from being introduced between said rotor and said stator, stopping rotation of said mold and said rotor, stator and bearing assembly after said material solidifies, said predetermined amount of material being such that under the centrifugal force of rotation is extends inwardly in the mold beyond the radially outer part of said bearing assembly but no farther inwardly than said stator bore, solidifying said molding material, and subsequently releasing said bearing assembly relative to said rotor and removing said shim means to release said rotor and stator relative to each other.

2. A method of making a dynamoelectric machine comprising the steps of positioning a stator and a rotor having a shaft extending from each end in concentric relation by providing shim means between them, mounting a pair of bearing assemblies about the rotor shaft respectively at each side of the rotor in rotatable relation therewith, at least part of each bearing assembly extending radially outward beyond the stator bore, securing said bearing assemblies rigidly with respect to said rotor, securing a mold about said rotor, stator, and bearing assemblies in rigid relationship therewith, said mold substantially enclosing at least said stator, rotating said mold and said rotor, stator and bearing assembly about the axis of said shaft at a predetermined speed sufficient to retain by centrifugal force any material introduced in said mold in the radially outer portion of the mold, said mold having an opening in at least one end thereof, introducing a predetermined amount of plastic non-hygroscopic molding material to the interior of said mold through said opening, said material being introduced by means of a feed member cooperating with said opening, said feed member causing said material to be introduced in a radially outward direction within said mold to prevent said material from entering between said stator and rotor, stopping the rotation of said mold and said rotor, stator and bearing assembly after said materials have solidified, said predetermined amount of material being such that under the centrifugal force of rotation it extends inwardly in said mold beyond the radially outer part of said bearing assemblies but no farther than said stator bore, solidifying said molding material, and subsequently releasing said bearing assembly relative to said rotor and removing said shim means to release said rotor and stator relative to each other.

3. A method of making a dynamoelectric machine comprising the steps of positioning a stator and a rotor having a shaft extending from each end in concentric relation by providing shim means between them, mounting a pair of bearing assemblies about the rotor shaft respectively at the ends of said rotor in rotatable relation therewith, each of said bearing assemblies having a peripheral flange portion extending radially outward substantially beyond the stator bore, securing said bearing assemblies rigidly with respect to said rotor, securing a mold in rigid relationship about said rotor, stator and bearing assemblies, said mold having an opening in at least one end thereof, said mold substantially enclosing at least said stator, rotating said mold about the axis of said shaft at a predetermined speed sufficient to retain by centrifugal force any material introduced in said mold in the radially outward portion of the mold introducing a predetermined amount of plastic, non-hygroscopic molding material of relatively high dielectric strength to the interior of said mold through said opening, said material being introduced by means of a feed member cooperating with said opening, said feed member causing said material to be introduced in a radially outward direction within the interior of said mold to prevent said material from entering between said rotor and stator stopping rotation of said mold after said material has solidified, said predetermined amount of material being such that under the centrifugal force of rotation it extends inwardly in said mold beyond the radially outer part of said bearing assemblies but no farther than said stator bore, solidifying said molding material, and subsequently releasing said bearing assemblies relative to said rotor and removing said shim means to release said rotor and stator relative to each other.

4. A method of making a dynamoelectric machine comprising the steps of positioning a stator and a rotor having a shaft extending from each end in concentric relation by providing shims between them, mounting a pair of bearing assemblies about said rotor shaft respectively at the ends of said rotor in rotatable relation therewith, at least part of said bearing assemblies extending radially outward beyond said stator bore, at least one bearing assembly having openings formed therein substantially aligned with said shims, securing said bearing assemblies in rigid relation to said rotor shaft, securing a mold in a rigid relationship about said rotor, stator and bearing assemblies, said mold having an opening in at least one end thereof, rotating said mold at a predetermined speed sufficient to retain by centrifugal force any material introduced in said mold in the radially outer portion of said mold introducing a predetermined amount of plastic, non-hygroscopic molding material of relatively high dielectric strength to the interior of said mold through said opening, said material being introduced by means of a feed member cooperating with said opening, stopping rotation of said mold after said material has solidified, said predetermined amount of material being such that under the centrifugal force of rotation it extends inwardly in said mold beyond the radially outer part of said bearing assemblies but no farther than the stator bore, solidifying said molding material, releasing said bearing assemblies so that they are in their normal rotatable relation with said rotor, and pulling said shims through the openings in said one bearing assembly so as to release said rotor and stator relative to each other.

5. A method of making a dynamoelectric machine comprising the steps of positioning a stator and a rotor having a shaft extending from each end in concentric relation by providing shim means between them, mounting a pair of bearing assemblies about said rotor shaft respectively at the ends of said rotor in rotatable relation therewith, at least part of each bearing assembly extending radially outward beyond said stator bore, securing said bearing assemblies rigidly with respect to said rotor, positioning a mold about said rotor, stator and bearing assemblies with said mold being secured to one end of said shaft, said mold having an opening in its end opposite to which it is secured to said shaft, said mold substantially enclosing at least said stator and being associated with said rotor, stator and bearing assemblies in rigid relationship therewith, rotating said mold about the axis of said shaft at a predetermined speed sufficient to cause the material to be retained in the radially outer part of the mold introducing a predetermined amount of plastic, non-hygroscopic molding material of relatively high dielectric strength into said mold through said opening, said material being introduced by means of a feed member cooperating with said opening, said feed member introducing said material at a point within the interior of said mold during rotation so that said material is prevented from entering between said rotor and stator, stopping rotation of said mold after said material has solidified, said predetermined amount of material being such that under the centrifugal force of rotation it extends inwardly in said mold beyond the radially outer part of said bearing assemblies but no farther than said stator bore, solidifying said molding material, releasing said bearing assemblies so that they are in their normal rotatable relation to said shaft, and removing said shim means to release said rotor and stator relative to each other.

References Cited in the file of this patent

UNITED STATES PATENTS

| 768,306 | Rivers | Aug. 23, 1904 |
| 994,355 | Wirt | June 6, 1911 |
| 2,548,133 | Treat | Apr. 10, 1951 |
| 2,677,065 | Van der Heem | Apr. 27, 1954 |
| 2,695,856 | Firth | Nov. 30, 1954 |

OTHER REFERENCES

Wightman: 757,652 (filed Aug. 26, 1958, as a continuation-same assignee, now abandoned).